United States Patent
Yamamori et al.

(10) Patent No.: US 12,276,327 B2
(45) Date of Patent: Apr. 15, 2025

(54) TOOTHED PULLEY

(71) Applicants: JTEKT CORPORATION, Aichi (JP); NAKANISHI METAL WORKS CO., LTD., Osaka (JP)

(72) Inventors: Ayumi Yamamori, Aichi (JP); Masayoshi Nakamura, Osaka (JP); Mitsuru Saitoh, Osaka (JP); Nobumasa Oka, Osaka (JP)

(73) Assignees: JTEKT CORPORATION, Aichi (JP); NAKANISHI METAL WORKS CO., LTD., Osaka (JP)

( * ) Notice: Subject to any disclaimer, the term of this patent is extended or adjusted under 35 U.S.C. 154(b) by 73 days.

(21) Appl. No.: 17/647,873

(22) Filed: Jan. 13, 2022

(65) Prior Publication Data
US 2022/0228656 A1 Jul. 21, 2022

(30) Foreign Application Priority Data

Jan. 15, 2021 (JP) .................................. 2021-004734
Jan. 15, 2021 (JP) .................................. 2021-004735

(51) Int. Cl.
*F16H 55/17* (2006.01)
(52) U.S. Cl.
CPC .................................. *F16H 55/171* (2013.01)
(58) Field of Classification Search
CPC ........ F16H 55/171; F16H 55/17; F16H 55/06; F16H 55/48; F16H 2055/306; F16H 2055/065
USPC ....................................................... 474/161
See application file for complete search history.

(56) References Cited

U.S. PATENT DOCUMENTS

| 1,999,409 | A | * | 4/1935 | Fox | F16H 55/42 156/289 |
| 3,696,685 | A | * | 10/1972 | Lampredi | F16H 57/0025 474/903 |
| 3,772,928 | A | * | 11/1973 | Gobeille | F16H 55/48 474/902 |
| 4,473,363 | A | * | 9/1984 | McCutchan, Jr. | F16H 55/48 474/190 |
| 4,722,722 | A | * | 2/1988 | Rampe | F16H 55/48 474/161 |

(Continued)

FOREIGN PATENT DOCUMENTS

| CN | 110366674 A | * | 10/2019 | ........ G01M 17/0078 |
| DE | 2729703 A1 |   | 1/1979 |  |

(Continued)

OTHER PUBLICATIONS

WO 2018021194 A1 Ogura (Year: 2018).*

*Primary Examiner* — Henry Y Liu
*Assistant Examiner* — Katelynne R Burrell
(74) *Attorney, Agent, or Firm* — INNOVATION CAPITAL LAW GROUP, LLP; Vic Lin

(57) ABSTRACT

A toothed pulley includes a cylindrical metallic core and a resin portion including teeth. The metallic core has, at one end thereof in the axial direction, an outward flange projecting outward in the radial direction. The outward flange has a radially outer peripheral surface that is a rotation prevention shape having a plurality of parts displaced inward in the radial direction from a cylindrical surface of the radially outer peripheral surface. The radially outer peripheral surface of the outward flange is covered by the resin portion.

5 Claims, 14 Drawing Sheets

(56) References Cited

U.S. PATENT DOCUMENTS

| | | | | |
|---|---|---|---|---|
| 4,946,427 A * | 8/1990 | Rampe | F16H 7/023 | 29/893 |
| 5,026,329 A * | 6/1991 | Diekevers | B62D 55/135 | 474/162 |
| 5,361,883 A * | 11/1994 | Yamamoto | F16D 27/14 | 474/174 |
| 5,368,525 A * | 11/1994 | Funahashi | F16H 55/48 | 474/190 |
| 5,931,755 A * | 8/1999 | Mailey | B29C 45/0005 | 474/190 |
| 6,200,513 B1 * | 3/2001 | Emmett | B29C 43/18 | 264/274 |
| 6,626,098 B1 * | 9/2003 | Kanamori | B41J 2/32 | 400/120.13 |
| 7,237,670 B1 * | 7/2007 | Ryan | B65G 17/24 | 198/779 |
| 8,096,204 B2 * | 1/2012 | Imagaki | F16H 55/06 | 74/DIG. 10 |
| 8,646,352 B2 * | 2/2014 | Tanaka | B62D 5/0409 | 74/449 |
| 9,611,858 B2 * | 4/2017 | Furusawa | F04D 29/04 | |
| 9,958,050 B2 * | 5/2018 | Kolloch | F16H 55/48 | |
| 10,190,654 B2 * | 1/2019 | Manzoor | F16H 55/36 | |
| 2001/0040316 A1 * | 11/2001 | Stewart | B29C 39/10 | 264/469 |
| 2003/0195072 A1 * | 10/2003 | Redmond | F16H 55/30 | 474/152 |
| 2007/0232428 A1 * | 10/2007 | Hamada | F16C 35/067 | 474/166 |
| 2008/0161141 A1 | 7/2008 | Joo et al. | | |
| 2009/0282939 A1 * | 11/2009 | Rogowski | F16H 55/06 | 74/424.5 |
| 2014/0064931 A1 * | 3/2014 | Furusawa | F16H 55/36 | 415/122.1 |
| 2018/0274648 A1 * | 9/2018 | Feuerborn | F16H 55/06 | |
| 2020/0141479 A1 * | 5/2020 | Feuerborn | F16H 55/42 | |
| 2020/0182345 A1 * | 6/2020 | Gu | F16H 55/17 | |
| 2020/0292048 A1 * | 9/2020 | Feuerborn | F16H 55/171 | |
| 2022/0250294 A1 * | 8/2022 | Nakamura | B29C 45/0046 | |

FOREIGN PATENT DOCUMENTS

| | | | | |
|---|---|---|---|---|
| DE | 102006059946 A1 | 7/2007 | | |
| DE | 202007011358 U1 * | 11/2007 | | F16D 41/064 |
| EP | 1950122 A1 | 7/2008 | | |
| EP | 3401573 A1 | 11/2018 | | |
| EP | 3409976 A1 * | 12/2018 | | B62D 5/0424 |
| EP | 4030081 A1 * | 7/2022 | | B29C 45/14491 |
| JP | 61040983 | 11/1986 | | |
| JP | H10246315 A | 9/1998 | | |
| JP | 2000185656 A | 7/2000 | | |
| JP | 2001227620 A | 8/2001 | | |
| JP | 2006039008 A * | 2/2006 | | |
| JP | 2007309512 A | 11/2007 | | |
| JP | 2008163967 A | 7/2008 | | |
| JP | 2010139041 A | 6/2010 | | |
| JP | 2018090081 A | 6/2018 | | |
| JP | 2020044854 A | 3/2020 | | |
| WO | WO-2018021194 A1 * | 2/2018 | | B29C 45/14 |
| WO | WO-2021005313 A1 * | 1/2021 | | B67B 7/066 |

* cited by examiner

TOOTHED PULLEY

FIELD

The present invention relates to a toothed pulley to be engaged with a toothed belt.

BACKGROUND

As a power transmission mechanism of an electric power steering apparatus, a belt transmission mechanism provided with a driving toothed pulley, a driven toothed pulley, and a toothed belt is used (see a belt transmission mechanism 30 disclosed in Patent Literature 1, for example).

A material used for the toothed pulley is normally steel for satisfying a required specification regarding strength and accuracy. Here, there are toothed pulleys having teeth that are made of a synthetic resin and are combined with a cylindrical metallic core, for reducing the weight (e.g., a hub base body 2 disclosed in Patent Literature 2) (see Patent Literature 2, for example).

CITATION LIST

Patent Literature

Patent Literature 1: Japanese Unexamined Patent Application Publication No. 2020-44854
Patent Literature 2: German Unexamined Patent Application Publication No. 102006059946
Patent Literature 3: Japanese Unexamined Patent Application Publication No. 2008-163967
Patent Literature 4: Japanese Examined Utility Model Publication No. Sho. 61-40983

SUMMARY

Technical Problem

If a toothed pulley is constituted by a cylindrical metallic core and a resin portion including teeth, it is necessary to prevent the relative rotation of the metallic core and the resin portion in the circumferential direction.

As for an example of such prevention of the relative rotation in the circumferential direction, Patent Literature 3 discloses, for example, that a resin pulley body 22 is formed by insert molding to a metal attachment member 21 that is pressed and fitted in an outer ring 11 of a bearing 10 in a pulley-mounted bearing device 106. The pulley-mounted bearing device 106 is an idler pulley that presses a back surface of a toothed belt 105, and thus is not the toothed pulley.

In the pulley-mounted bearing device 106 according to Patent Literature 3, rectangular openings 21c are formed at an equal interval in the circumferential direction on the outer periphery of a hollow cylindrical part 21a of the metal attachment member 21. The resin pulley body 22 is formed by insert molding onto the radially outside of the metal attachment member 21 with the metal attachment member 21 as an insert article. Thus, the molten resin enters the openings 21c and is solidified to prevent the metal attachment member 21 from turning in the circumferential direction and from falling out in the axial direction.

The configuration disclosed in Patent Literature 3 may be used for a toothed pulley in which high accuracy is required for teeth. In such a case, thickness of the resin pulley body 22 in the radial direction increases, and thus the difference in thickness between the resin pulley body 22 and the whole depth of the teeth increases. This increases the differential shrinkage. Accordingly, the required specification for the accuracy in teeth cannot be satisfied. In addition, it is necessary to increase thickness of the metal attachment member 21. This causes the weight of the toothed pulley to increase. Furthermore, a molten resin enters openings 21c, so that burrs are generated in the inner diameter side of the metal attachment member 21. If the rectangular openings 21c aligned in the metal attachment member 21 in the circumferential direction are formed through press molding, the burrs are generated in the inner diameter side of the metal attachment member 21. These require another step for removing the burrs.

As another example of such prevention of the relative rotation of components in the circumferential direction, Patent Literature 4 discloses, for example, that a synthetic resin ring 4 is formed by insert molding to a metal annular member 8 that is to be pressed and fitted to an outer ring 3 of a bearing 2 in a rotation ring 1. Here, the rotation ring 1 is a load pulley, and thus is not the toothed pulley.

In the rotation ring 1 disclosed in Patent Literature 4, an eccentric flange 7 projecting in the radially outward direction is provided in an axial end of the metal annular member 8. Then, the synthetic resin ring 4 is formed by the insert molding onto the radially outside portion of the metallic annular body 8 with the metallic annular body 8 as an insert article. Thus, the molten resin is solidified to cover the eccentric flange 7, to thereby prevent the relative rotation of the metal annular member 8 and the synthetic resin ring 4 in the circumferential direction and to prevent the synthetic resin ring 4 from falling out in the axial direction.

The configuration disclosed in Patent Literature 4 may be used for a toothed pulley required to increase the accuracy in teeth. In such a case, thickness of the synthetic resin ring 4 in the radial direction increases, and thus the difference between the thickness of the synthetic resin ring 4 and the whole depth of the teeth increases. This also increases the differential shrinkage. Accordingly, the required specification for the accuracy in teeth cannot be satisfied.

As a method of preventing the relative rotation of the cylindrical metallic core and the resin portion including teeth in the circumferential direction, knurling may be applied on an outer peripheral surface of the metallic core and knurled parts that define a twill line may be formed on the outer peripheral surface, for example. In this method, the insert injection molding is performed with the metallic core as an insert article, to allow the synthetic resin to enter the knurled parts. Accordingly, the metallic core and the resin portion are prevented from relatively rotating in the circumferential direction.

The knurling applied to the metallic core requires a step of forming the knurled parts on the outer peripheral surface of the metallic core by pressing a knurl tool thereto while rotating the metallic core by means of a lathe or the like. This increases the machining cost of the knurling, thereby increasing the manufacturing cost for the toothed pulley.

An object of the present invention is to prevent, in a toothed pulley including a cylindrical metallic core and a resin portion with teeth, the metallic core and the resin portion from relatively rotating in the circumferential direction while securing the accuracy in teeth and preventing the manufacturing cost from increasing.

Solution to Problem

In order to solve the above problem, a toothed pulley according to the present invention includes a cylindrical metallic core, and a resin portion including teeth, in which the metallic core has, at one end thereof in an axial direction, an outward flange projecting outward in a radial direction, the outward flange has a radially outer peripheral surface with a plurality of parts displaced inward in the radial direction from the radially outer peripheral surface having a cylindrical shape, and the radially outer peripheral surface of the outward flange is covered by the resin portion.

In this configuration, the resin portion includes a portion including the teeth of the toothed pulley, so that the weight of the toothed pulley can be reduced. The radially outer peripheral surface of the outward flange of the metallic core has a plurality of parts displaced in the radially inward direction from the radially outer peripheral surface having a cylindrical shape. The radially outer peripheral surface of the outward flange is covered by the resin portion. Therefore, the metallic core and the resin portion can be prevented from relatively rotating in the circumferential direction.

In addition, the shape of the radially outer peripheral surface of the outward flange of the metallic core, i.e., the shape including a plurality of parts displaced in the radially inward direction from the cylindrical surface, can be formed through press working. Therefore, it is not necessary to perform postprocessing, such as knurling, thereby preventing the manufacturing cost from increasing.

Furthermore, the radially outer peripheral surface of the outward flange of the metallic core has a shape including a plurality of parts displaced in the radially inward direction from the cylindrical surface, thereby reducing the projection length of the outward flange in the radially outward direction. Accordingly, the thickness of the resin portion in the radial direction does not increase, so that the difference in thickness between the resin portion and the whole depth of the teeth is reduced and the differential shrinkage is also reduced. Therefore, the required specification for the accuracy in teeth of the toothed pulley can be easily satisfied.

Here, it is preferable that the metallic core includes a first metallic core, and a second metallic core that is positioned outward of the first metallic core in the radial direction to have a gap relative to the first metallic core in the radial direction, the second metallic core being concentric with the first metallic core, the first metallic core has, at an end in the axial direction, the outward flange, the resin portion is made of a thermoplastic resin, and the resin portion is a single component including a resin in the gap between the first metallic core and the second metallic core and a resin of the teeth.

With the configuration, the shape of the radially outer peripheral surface of the outward flange of the first metallic core can prevent the relative rotation, in the circumferential direction, of the resin portion and the first metallic core defining the inner diameter of the toothed pulley. Furthermore, the cylindrical metallic core of the toothed pulley is formed by the first metallic core and the second metallic core, thereby reducing the thickness of the metallic core. Thus, the weight of the toothed pulley can be reduced. Still furthermore, the resin portion is made of a thermoplastic resin, so that the productivity of the toothed pulley increases.

In addition, the cylindrical metallic core includes the first metallic core defining the inner diameter of the toothed pulley and the second metallic core positioned radially outward of the first metallic core. Accordingly, the thickness of the resin portion that is positioned radially outward of the second metallic core can be appropriately set by the second metallic core, so that the specification required for the accuracy in teeth of the toothed pulley can be more easily satisfied.

It is preferable that the metallic core has the second metallic core has, at a first end or a second end thereof in the axial direction, an outward flange projecting radially outward or an inward flange projecting radially inward, the outward flange has a radially outer peripheral surface with a plurality of parts displaced inward in the radial direction from the radially outer peripheral surface having the cylindrical shape, the inward flange has a radially inner peripheral surface with a plurality of parts displaced outward in the radial direction from the radially inner peripheral surface having a cylindrical shape, and the radially outer peripheral surface of the outward flange or the radially inner peripheral surface of the inward flange is covered by the resin portion.

With such a configuration, the shape of the radially outer peripheral surface of the outward flange of the second metallic core or the shape of the radially inner peripheral surface of the inward flange can prevent the relative rotation of the second metallic core and the resin portion in the circumferential direction.

Furthermore, the shape of the radially outer peripheral surface of the outward flange of the second metallic core or the shape of the radially inner peripheral surface of the inward flange of the second metallic core can be formed through the press working. Therefore, it is not necessary to perform, after the press working, postprocessing, such as knurling, thereby preventing the manufacturing cost from increasing.

Still furthermore, the shape of the radially outer peripheral surface of the outward flange of the second metallic core has a plurality of parts displaced in the radially inward direction from the cylindrical surface, so that the projection length of the outward flange in the radially outward direction can be reduced. Alternatively, the shape of the radially inner peripheral surface of the inward flange of the second metallic core has a plurality of parts that are displaced in the radially outward direction from the cylindrical surface, thereby reducing the projection length of the inward flange in the radially inward direction. Accordingly, the thickness of the resin portion in the radial direction does not increase, so that the difference in thickness between the resin portion and the whole depth of the teeth is reduced and the differential shrinkage is also reduced. Therefore, it is easy to satisfy the required specification for the accuracy in teeth of the toothed pulley.

It is preferable that the first metallic core has, at one end thereof in the axial direction, a bottom plate, and the bottom plate is provided with a plurality of attachment holes penetrating in the axial direction, and a plurality of through holes which the resin portion enters.

With this configuration, the toothed pulley can be easily and surely fixed to a member, to which the toothed pulley is to be attached, by bolts penetrating from the respective attachment holes of the first metallic core. In addition, the weight of the first metallic core can be reduced by the through holes. Furthermore, the resin portion enters the through holes of the first metallic core, thereby exhibiting the function of preventing the first metallic core and the resin portion including the teeth from relatively rotating in the circumferential direction.

Furthermore, it is preferable that the resin portion has, at one end thereof in the axial direction, a bottom plate, and the bottom prate is provided with a notch for allowing the attachment holes in the bottom plate of the first metallic core to be exposed in the axial direction.

With such a configuration, the strength and the rigidity of the resin portion are enhanced by the bottom plate provided in the resin portion. In addition, the notch is provided in the bottom plate of the resin portion, thereby allowing the attachment holes in the bottom plate of the first metallic core to be exposed in the axial direction. Therefore, when the toothed pulley is attached to a member to which the toothed pulley is to be attached, the bottom plate of the resin portion does not disturb.

It is preferable that the resin portion has, at one end thereof in the axial direction, an outward flange projecting radially outward of a tip end of each of the teeth.

With such a configuration, a toothed belt engaged with the toothed pulley can be restricted from moving in the axial direction, by the outward flange.

It is preferable that a thickness F of a tooth bottom of each of the teeth in the resin portion in an inner diameter side thereof and whole depth E of each of the teeth satisfies E≤F≤3 mm.

With such a configuration, the accuracy in teeth can be easily secured while preventing the increase in weight of the toothed pulley.

Advantageous Effects

In the aforementioned toothed pulley according to the present invention, which includes a cylindrical metallic core and a resin portion including teeth, the metallic core and the resin portion can be prevented from relatively rotating in the circumferential direction while securing the accuracy in the teeth and preventing the manufacturing cost from increasing.

DESCRIPTION OF EMBODIMENTS

Hereinafter, embodiments of the present invention are described with reference to the accompanied drawings.

A toothed pulley according to an embodiment of the present invention is used for a power transmission mechanism in an electric power steering apparatus. Thus, high accuracy is required for the toothed pulley according to the embodiment of the present invention.

Figure 5A:
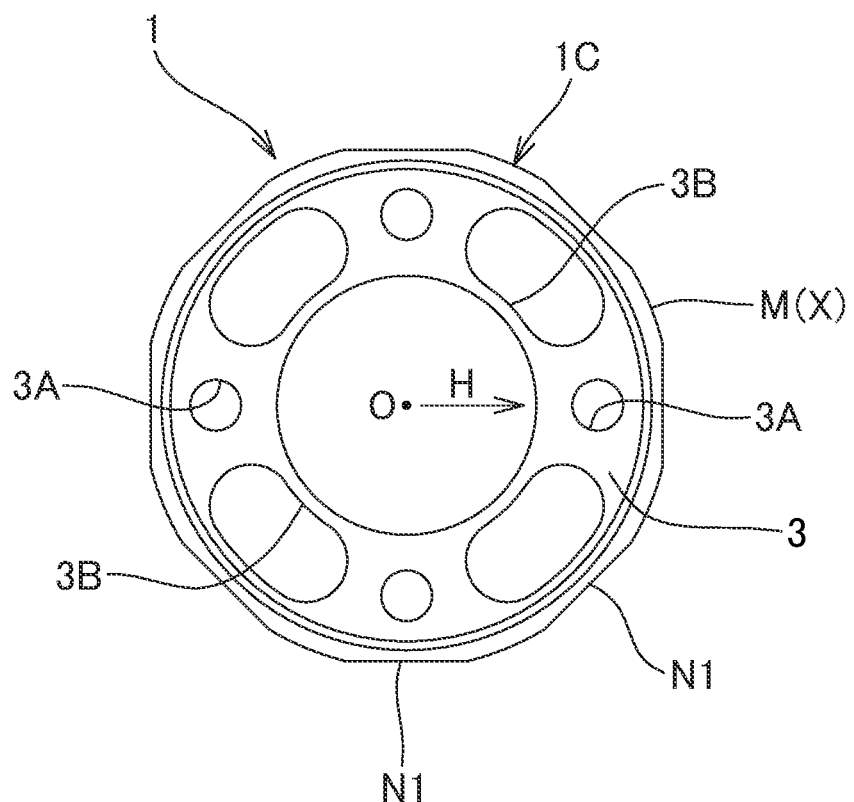
FIG. 5A shows the first metallic core seen in the axial direction.
Figure 5B:
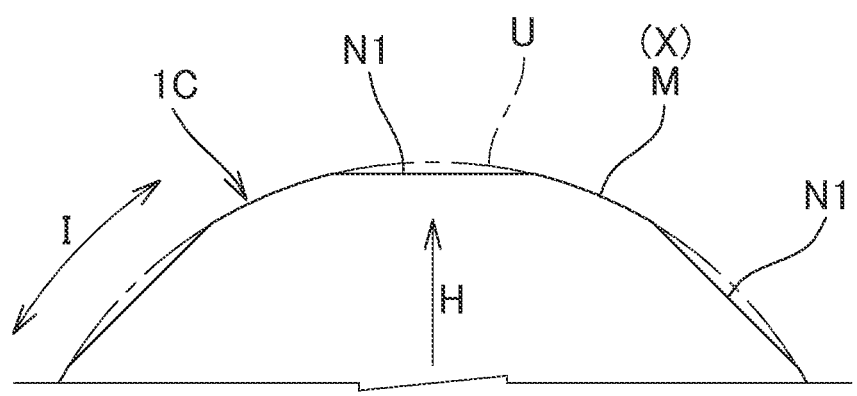
FIG. 5B is an explanatory view of an enlarged main part of a rotation prevention shape of an outward flange in the first metallic core.
Figure 15A:
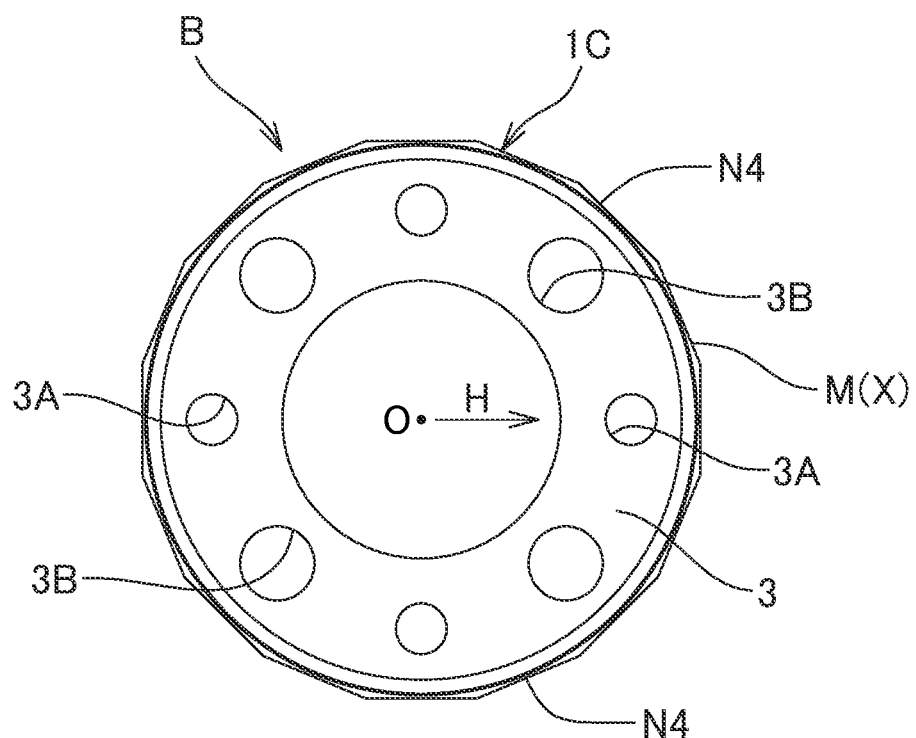
FIG. 15A shows the metallic core seen in the axial direction.
Figure 15B:
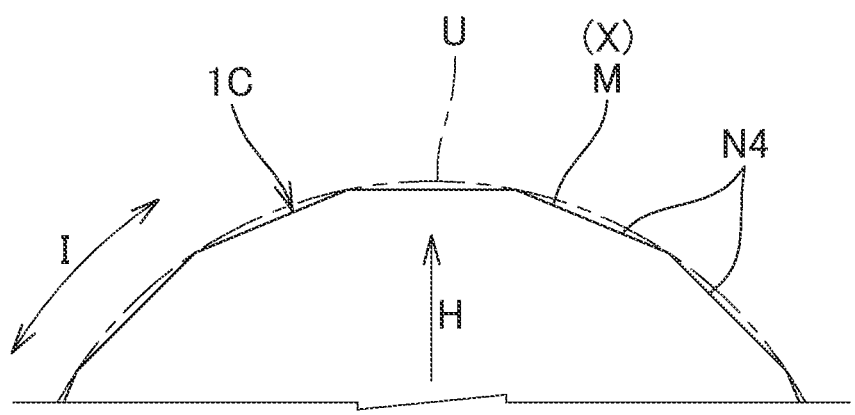
FIG. 15B is an explanatory view of an enlarged main part of the rotation prevention shape of the outward flange in the metallic core.

In the description, a direction orthogonal to the rotation axis (see the reference numeral O in FIGS. 3A, 5A, 13A, and 15A) of the toothed pulley is referred to as a "radial direction" (see an arrow H in FIGS. 3A, 5A, 13A, and 15A), and a direction parallel to the rotation axis is referred to as an "axial direction" (see an arrow J in FIGS. 3A and 13A), and a horizontal direction orthogonal to the "radial direction" with a direction along the rotational axis being made to be vertical is referred to as a "circumferential direction" (see an arrow I in FIGS. 5B and 15B).

Embodiment 1

<Toothed Pulley>

Figure 1:
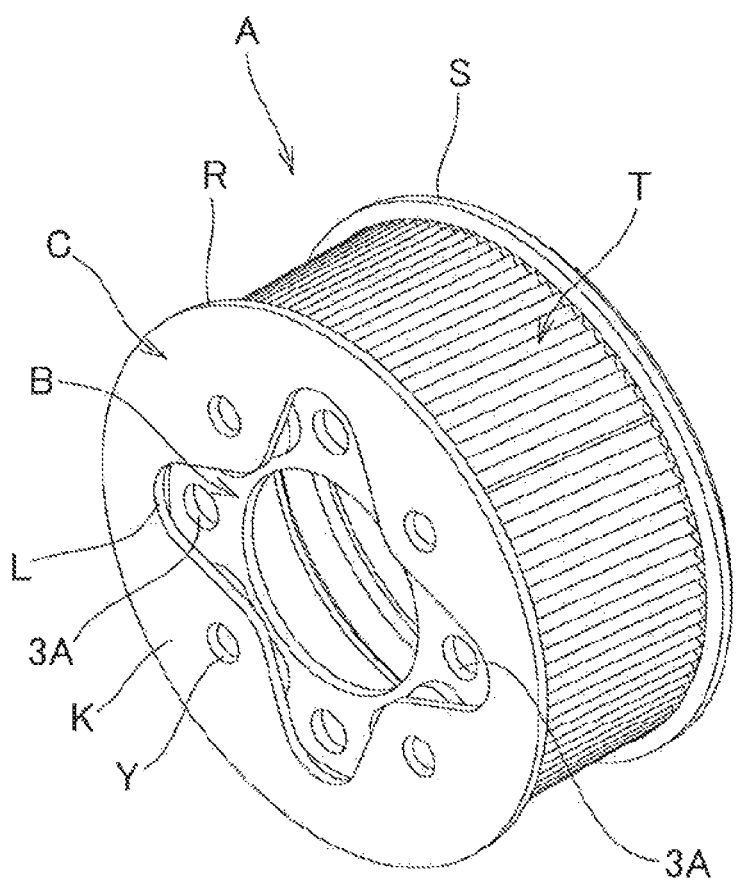
FIG. 1 is a perspective view of a toothed pulley according to Embodiment 1 of the present invention.
Figure 2:
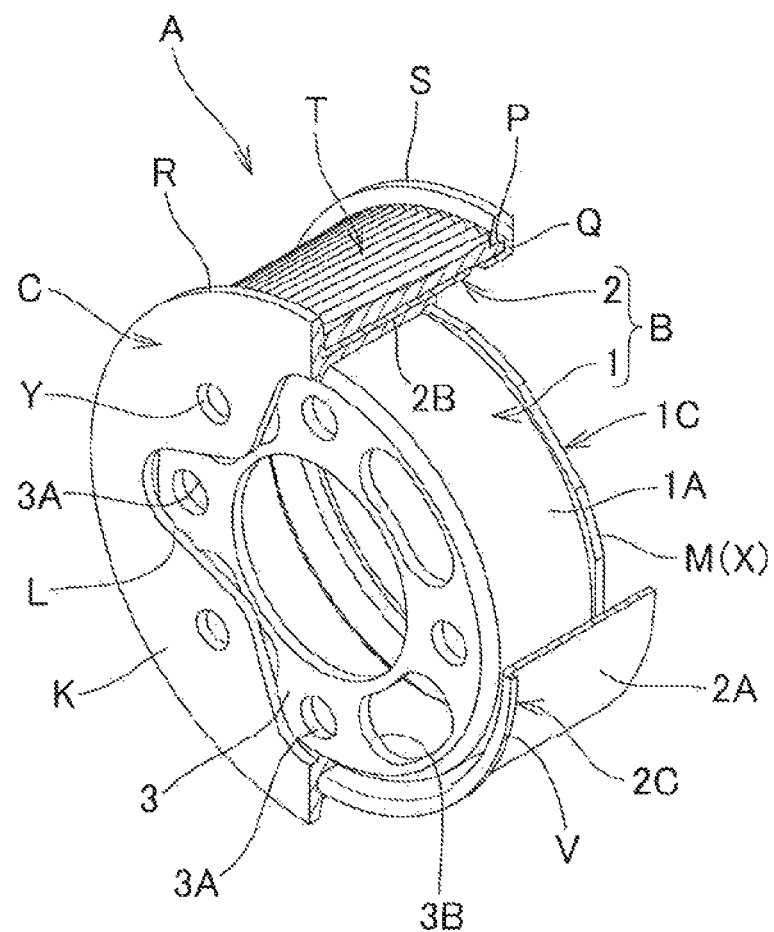
FIG. 2 is a perspective view with a partially vertical cross-sectional view, showing the toothed pulley shown in FIG. 1.
Figure 3A:
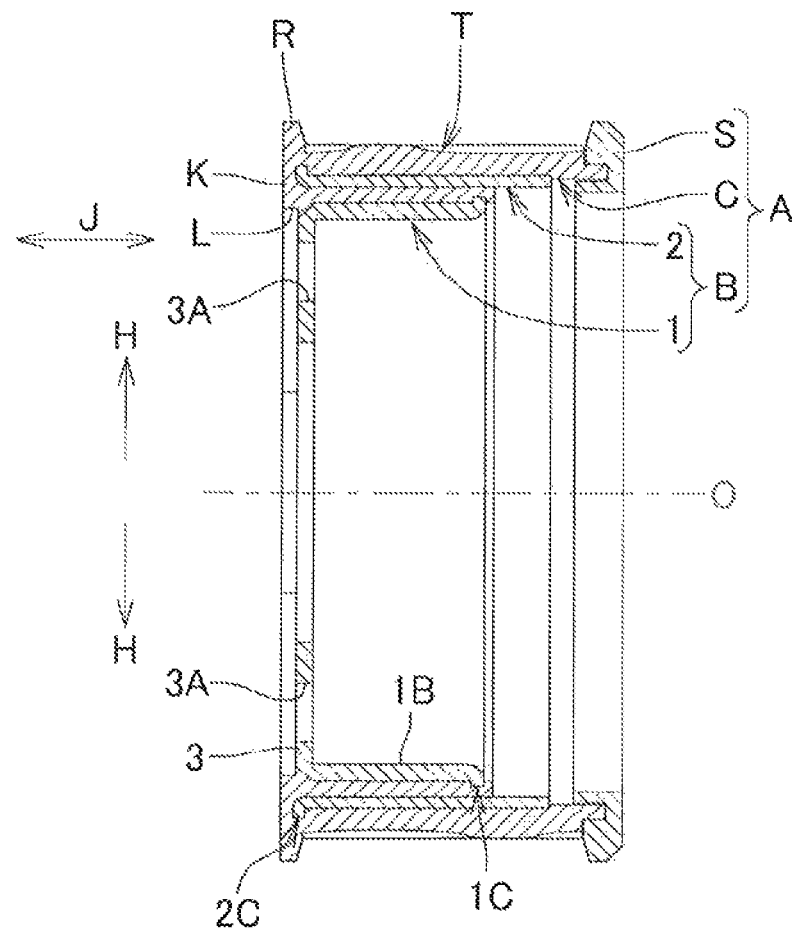
FIG. 3A is a vertical cross-sectional view of the toothed pulley shown in FIG. 1.
Figure 3B:
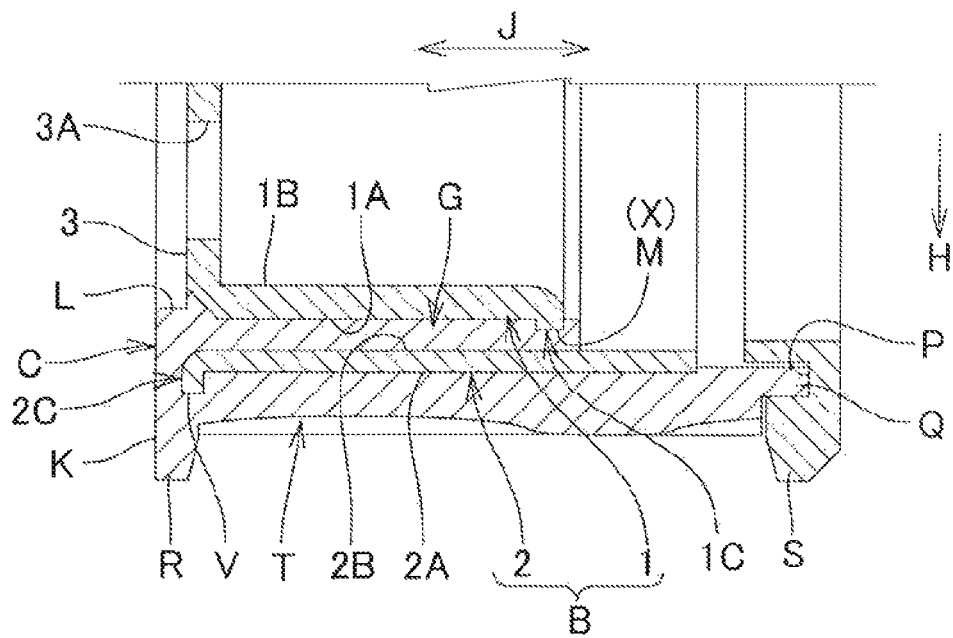
FIG. 3B is an enlarged view of a main part of the toothed pulley shown in FIG. 3A.

As shown in the perspective view of FIG. 1, the perspective view with the partial cross-sectional view of FIG. 2, the vertical cross-sectional view of FIG. 3A, and the vertical cross-sectional view of the enlarged main part in FIG. 3B, a toothed pulley A according to Embodiment 1 of the present invention includes a cylindrical metallic core B and a resin portion C that includes teeth T. In the toothed pulley A, the resin portion C includes a portion including the teeth T. Thus, the weight of the toothed pulley A can be reduced. The teeth T of the toothed pulley A are engaged with teeth of a toothed belt (not shown). The teeth T of the toothed pulley A according to the present embodiment are helical teeth.

<Metallic Core>

Figure 4:
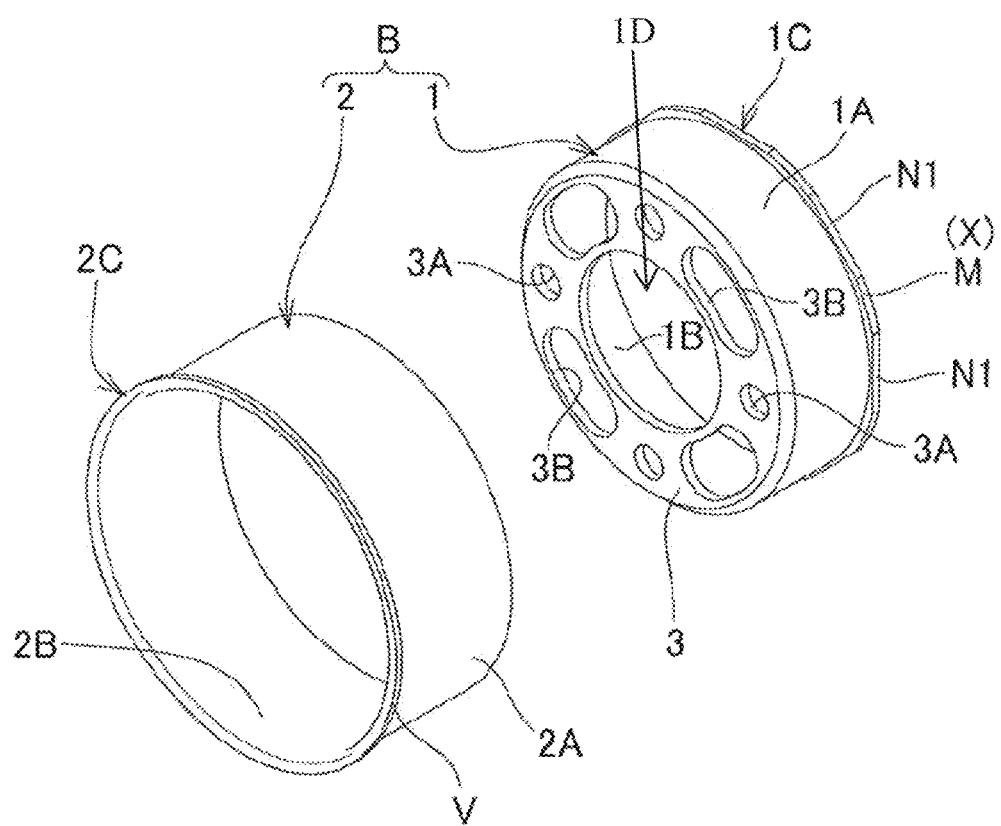
FIG. 4 is an exploded perspective view of a first metallic core and a second metallic core.

As shown in the perspective view with the partial cross-sectional view of FIG. 2, the vertical cross-sectional view of FIG. 3A, and the enlarged view of a main part in FIG. 3B, and the exploded perspective view of FIG. 4, the metallic core B has a double structure including first and second metallic cores 1 and 2 which are thin metallic cores. The first metallic core 1 has an inner peripheral surface 1B that is exposed and is attached to the outer peripheral surface of a nut member of a ball screw of the power transmission mechanism in an electric power steering apparatus (not shown) so as to be used for determining a position of the toothed pulley A relative to the nut of the ball screw in the radial direction. The metallic core 1 can include an open interior 1D, the open interior 1D can receive a separate component forming a rotation axis O of the toothed pulley A therein. The first and second metallic cores 1 and 2 are obtained by press working performed on a cold rolled steel plate, a hot rolled steel plate, a high-tensile steel plate, and so on.

The second metallic core 2 is positioned outward of the first metallic core 1 in the radial direction H with a gap G (FIG. 3B) relative to the first metallic core 1 in the radial direction H, and is concentric (coaxial) with the first metallic core 1. In other words, the gap G is interposed between an outer peripheral surface 1A of the first metallic core 1 and an inner peripheral surface 2B of the second metallic core 2.

The first metallic core 1 has a bottom plate 3 at one end in the axial direction J. In the bottom plate 3, there are provided a plurality of attachment holes 3A (in the present embodiment, four circular holes provided at an equal interval in the circumferential direction) penetrating in the axial direction J and a plurality of through holes 3B (in the present embodiment, four long holes that extend in the circumferential direction and are provided at an equal interval in the circumferential direction) which the resin portion C enters.

The toothed pulley A can be easily and surely fixed to a member to which the toothed pulley A is to be attached, using a bolt passing through each of the attachment holes 3A of the first metallic core 1. Furthermore, the through holes 3B of the first metallic core 1 contributes to the reduction in weight of the first metallic core 1 that is a cylindrical shape with a bottom. Still furthermore, the resin portion C enters the through holes 3B, thereby exhibiting the function of preventing the resin portion C including the teeth T and the first metallic core 1 from relatively rotating in the circumferential direction.

The first metallic core 1 has, at its other end in the axial direction J, an outward flange 1C (FIGS. 2, 3B, and 4, also referred to as a first outward flange 1C) projecting outward in the radial direction H. The outward flange 1C of the first metallic core 1 has a radially outer peripheral surface M inward of the inner peripheral surface 2B of the second metallic core 2 in the radial direction H. The outward flange 1C is provided in the first metallic core 1, thereby improving the rigidity of the first metallic core 1 and preventing the first metallic core 1 from falling down from the resin portion C in the axial direction J.

The second metallic core 2 has, at its one end in the axial direction J, an outward flange 2C (FIGS. 2, 3B, and 4, also referred to as a second outward flange 2C). The outward flange 2C is provided in the second metallic core 2, thereby improving the rigidity of the second metallic core 2 and preventing the second metallic core 2 from falling down from the resin portion C in the axial direction J.

<Rotation Prevention Shape>

As shown in the drawing seen in the axial direction in FIG. 5A and the explanatory view of an enlarged main part of FIG. 5B, the radially outer peripheral surface M of the outward flange 1C of the first metallic core 1 has a shape defined by cutting a part of a cylindrical surface U at a planar surface N1 perpendicular to the radial direction H, and has eight planar surfaces N1 at an equal interval in the circumferential direction. In other words, the planar surface N1 corresponds to a part displaced inward in the radial direction H from the cylindrical surface U.

As shown in the drawing seen in the axial direction in FIG. 5A and the explanatory view of an enlarged main part of FIG. 5B, the radially outer peripheral surface M of the outward flange 1C of the first metallic core 1 has a shape defined by cutting a part of a cylindrical surface U (the uncut portion referred to as a first portion of the radially outer peripheral surface M) at a planar surface N1 perpendicular to the radial direction H, and has eight planar surfaces N1 (also referred to as second portions of the radially outer peripheral surface M) at an equal interval in the circumferential direction. In other words, the planar surface N1 corresponds to a part displaced inward in the radial direction H from the cylindrical surface U.

Since the strength at a merging position of the resin portion C is not high, it is preferable to set the merging portion (weld portion) of the molten resin in the planar surface N1 upon the injection molding of the resin portion C, in order to displace the merging portion from a position where high stress in the rotation direction is applied due to the prevention of rotation in the circumferential direction I.

Figure 6A:
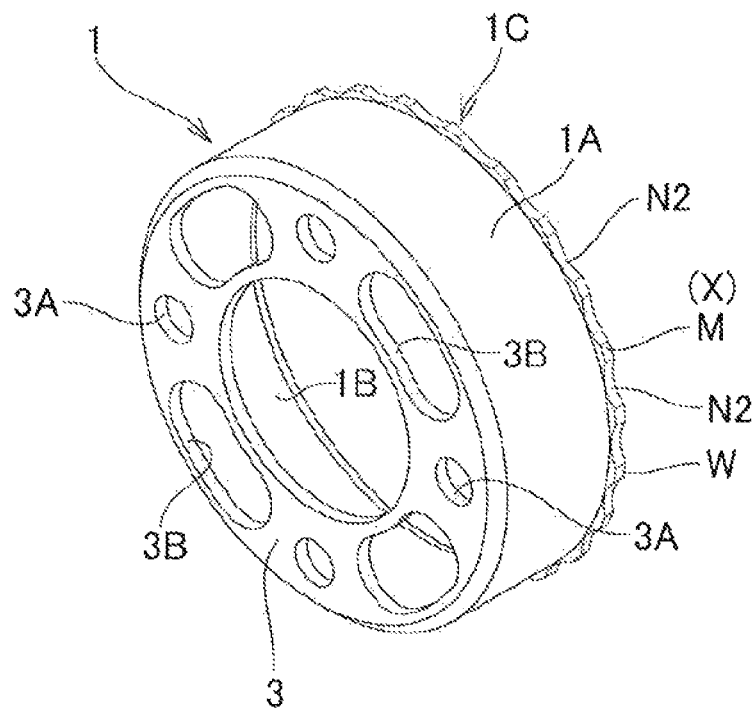
FIG. 6A is a perspective view of a first metallic core according to a variation.
Figure 6B:
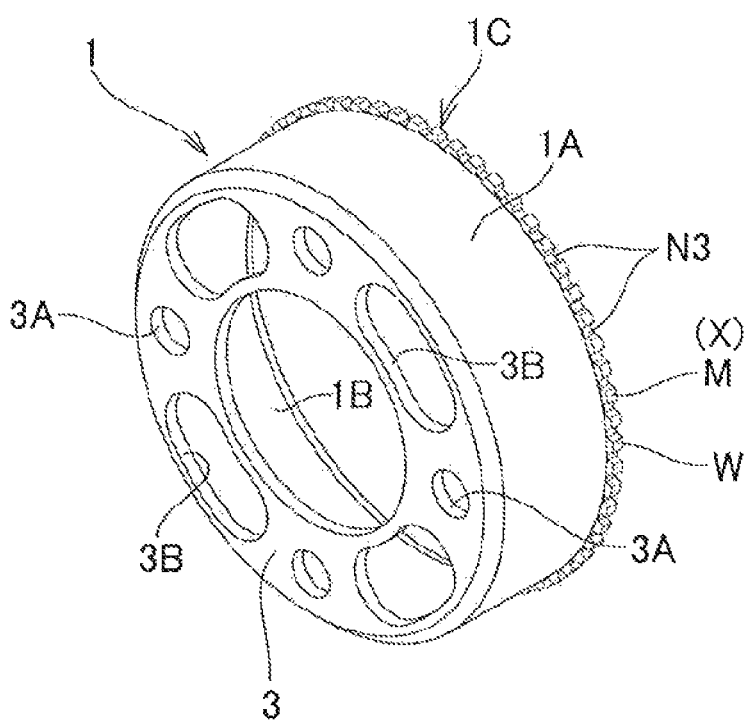
FIG. 6B is a perspective view of a first metallic core according to another variation.

The radially outer peripheral surface M (the shape X for preventing rotation in the circumferential direction I) of the outward flange 1C of the first metallic core 1 may have a plurality of teeth W, i.e., a plurality of teeth-shaped unevenness, in the circumferential direction as shown in the perspective views of FIGS. 6A and 6B. In the example shown in FIG. 6A, each of arcuately recessed surfaces N2 corresponds to the part that is displaced inward in the radial direction H from the cylindrical surface U (FIG. 5B). In the example shown in FIG. 6B, each of trapezoidally recessed surfaces N3 corresponds to the part that is displaced inward in the radial direction H from the cylindrical surface U (FIG. 5B).

In the toothed pulley A according to Embodiment 1 of the present invention, the shape of the radially outer peripheral surface M of the outward flange 1C of the first metallic core 1, i.e., the shape including a plurality of parts displaced inward in the radial direction H from the cylindrical surface U (e.g., N1 to N3) can be formed through the press working. Therefore, it is not necessary to perform, after the press working, postprocessing, such as the knurling, thereby preventing the manufacturing cost from increasing.

Furthermore, the radially outer peripheral surface M of the outward flange 1C of the first metallic core 1 has a plurality of parts that are displaced inward in the radial direction H from the cylindrical surface U, thereby reducing the projection length of the outward flange 1C outward in the radial direction H. Accordingly, the thickness of the resin portion C in the radial direction H does not increase, so that the difference in thickness between the resin portion C and the whole depth of the teeth is reduced and the differential shrinkage is also reduced. Therefore, the required specification for the accuracy in the teeth T of the toothed pulley A can be easily satisfied.

The radially outer peripheral surface V of the outward flange 2C (FIGS. 2, 3B, and 4) of the second metallic core 2 is a cylindrical surface in the present embodiment. The radially outer peripheral surface V of the outward flange 2C of the second metallic core 2 may serve as the shape X for preventing rotation in the circumferential direction I in the same manner as the case of the radially outer peripheral surface M of the outward flange 1C of the first metallic core 1. With this configuration, the shape X for preventing rotation in the circumferential direction I of the radially outer peripheral surface V of the outward flange 2C of the second metallic core 2 is covered by the resin portion C, thereby preventing the second metallic core 2 and the resin portion C from relatively rotating in the circumferential direction I.

Alternatively, an inward flange portion projecting in the radially inward direction, not the outward flange 2C, may be formed in the second metallic core 2, and the radially inner peripheral surface of the inward flange may have a plurality of parts that are displaced outward in the radial direction from the cylindrical surface. The shape also serves as a circumferentially-rotation prevention shape, and the circumferentially-rotation prevention shape is covered by the resin portion C, thereby preventing the second metallic core 2 and the resin portion C from relatively rotating in the circumferential direction I.

With these configurations, the shape of the radially outer peripheral surface V of the outward flange 2C of the second metallic core 2 or the shape of the radially inner peripheral surface of the inward flange can prevent the relative rotation of the second metallic core 2 and the resin portion C in the circumferential direction I.

In addition, the shape of the radially outer peripheral surface V of the outward flange 2C of the second metallic core 2 or the shape of the radially inner peripheral surface of the inward flange of the second metallic core 2 can be formed through the press working. Therefore, it is not necessary to perform, after the press working, postprocessing, such as knurling, thereby preventing the manufacturing cost from increasing.

Furthermore, the shape of the radially outer peripheral surface V of the outward flange 2C of the second metallic core 2 includes a plurality of parts that are displaced radially inward from the cylindrical surface, thereby reducing the projection length of the outward flange 2C in the radially outward direction. Alternatively, the shape of the radially inner peripheral surface of the inward flange of the second metallic core 2 includes a plurality of parts that are displaced radially outward from the cylindrical surface, thereby reducing the projection length of the inward flange in the radially inward direction. Accordingly, the thickness of the resin portion C in the radial direction H does not increase, so that the difference in thickness between the resin portion C and the whole depth of the teeth is reduced and the differential shrinkage is also reduced. Therefore, the required specification for the accuracy in the teeth T of the toothed pulley A can be easily satisfied.

<Resin Portion>

As shown in the perspective view with the partial cross-sectional view of FIG. 2, the vertical cross-sectional view of FIG. 3A, and the enlarged view of a main part in FIG. 3B, the resin portion C is a single component including the teeth T and a resin in the gap G between the first metallic core 1 and the second metallic core 2. The material of the resin C is a thermoplastic resin material including, PBT, PA6, PA66, PA46, PPS, PEEK, or the like, for example. Among them, it is preferable that several tens % by weight of glass fiber is combined as a reinforced material, into PPS that is excellent in thermal resistance, mechanical characteristics, fire resistant characteristics, dimensional stability, and so on.

The resin portion C has, at one end in the axial direction, an outward flange R projecting outward, in the radial direction H, of the tip ends of the teeth T. An engaging recessed portion P of an outward flange S made of a synthetic resin is engaged with an engaging protruding portion Q at the other end of the resin portion C in the axial direction, so that the position of the outward flange S is determined relative to the resin portion C in the axial direction and the radial direction. In this state, the outward flange S is attached to the resin portion C by ultrasonic welding, for example. Accordingly, the toothed pulley A has flanges in both sides in the axial direction and can restrict a toothed belt engaged with the toothed pulley A from moving in the axial direction.

The resin portion C has a bottom plate K at its one end in the axial direction. In the bottom plate K, a notch L is provided which allows the attachment holes 3A in the bottom plate 3 of the first metallic core 1 to be exposed in the axial direction. The bottom plate K provided in the resin portion C increases the strength and the rigidity of the resin portion C. In addition, the notch L is provided in the bottom plate K of the resin portion C, thereby allowing the attachment holes 3A in the bottom plate 3 of the first metallic core 1 to be exposed. Therefore, when the toothed pulley A is attached to a member to which the toothed pulley A is to be attached, the bottom plate K of the resin portion C does not disturb.

<Effect Obtained by Double Structure of Metallic Core>

The cylindrical metallic core B of the toothed pulley A includes the first metallic core 1 and the second metallic core 2, and thus the thickness of the metallic core B can be reduced. Therefore, the weight of the toothed pulley A can be reduced. Furthermore, the resin portion C is made of a thermoplastic resin, so that the productivity of the toothed pulley A increases.

Still furthermore, the cylindrical metallic core B is formed of the first metallic core 1 forming the inner diameter of the toothed pulley A and the second metallic core 2 positioned radially outward of the first metallic core 1. Accordingly, the second metallic core 2 contributes to appropriate setting of the thickness of the resin portion C positioned radially outward of the second metallic core 2. Therefore, it is easy to secure the accuracy required for the teeth T of the toothed pulley A. The inner diameter of the first metallic core 1 contributes to accurate positioning, in the radial direction, of the toothed pulley A relative to a nut of a ball screw. At the same time, the first and second metallic cores 1 and 2 are thin and the resin is embedded in the gap G between both the metallic cores, so that the weight of the metallic cores can be reduced in comparison with a case where the thickness of the outer diameter of the first metallic core 1 is increased to be equal to the outer diameter of the second metallic core 2.

<Thickness of Resin Portion Radially Outward of Second Metallic Core, and Relation with Whole Depth of the Teeth>

Figure 7:
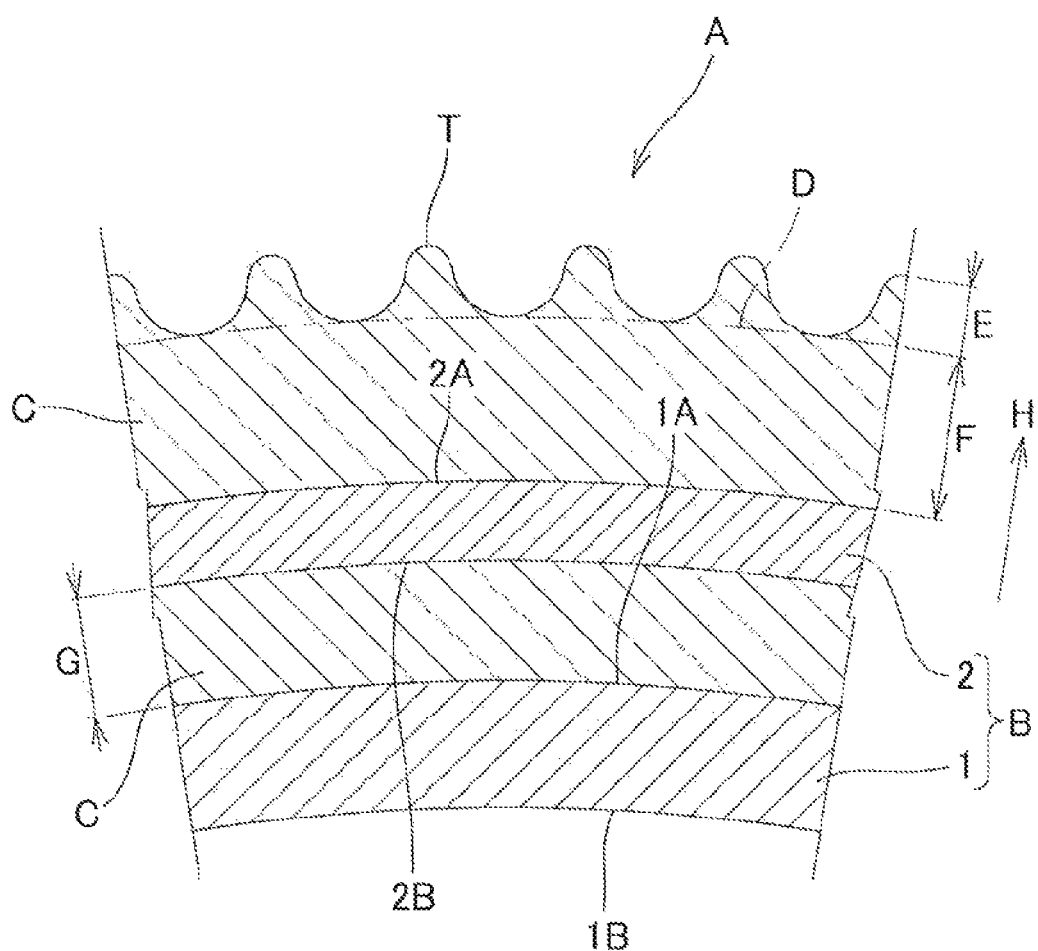
FIG. 7 is an end view of an enlarged main part of the toothed pulley of FIG. 1, seen in the axial direction.

As shown in the end view of an enlarged main part of FIG. 7, a distance, in the radial direction H, between a tooth-bottom circle D of the teeth T in the resin portion C and the outer peripheral surface 2A of the second metallic core 2, i.e., thickness F of the tooth bottom of the tooth T in the inner diameter side in the resin portion C, and whole depth E of the tooth T satisfy the relation expressed by $E \leq F \leq 3$ mm.

The thickness F of the tooth bottom of the teeth T in the inner diameter side in the resin portion C and the whole depth E of the teeth T are set to $E \leq F \leq 3$ mm, thereby easily securing the accuracy in the teeth T while preventing the weight of the toothed pulley A from increasing.

<Insert Molding>

Figure 8:
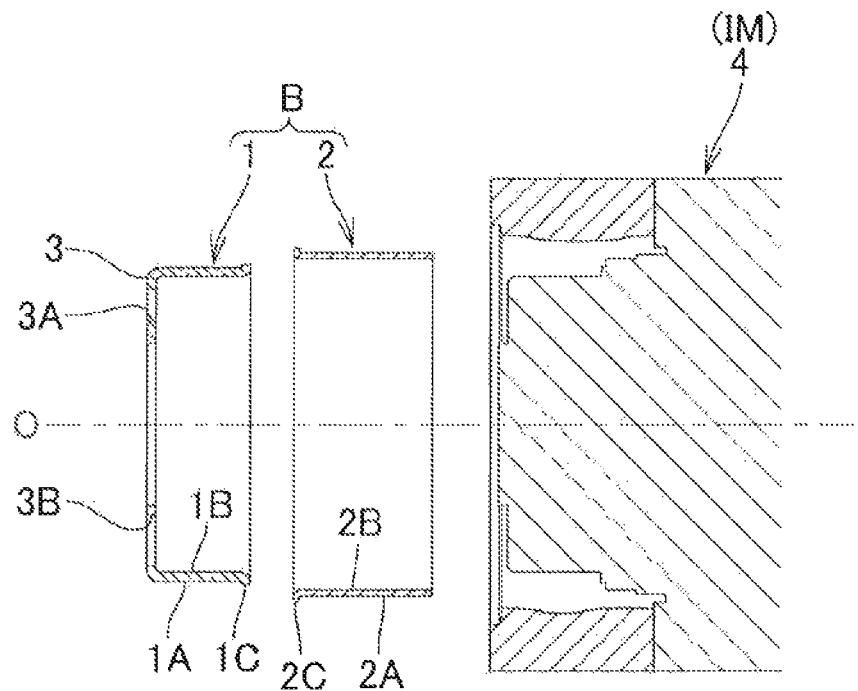
FIG. 8 is an exploded view of vertical cross-sections of a movable die, the first metallic core, and the second metallic core.
Figure 9:
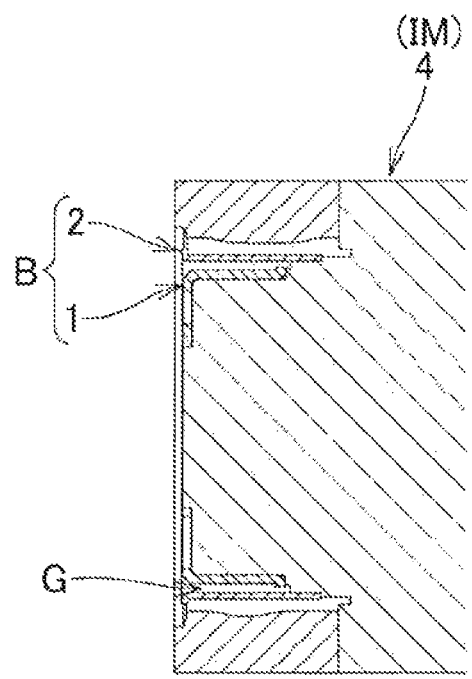
FIG. 9 is a vertical cross-sectional view of a state in which the first metallic core and the second metallic core are set in the movable die.
Figure 10:
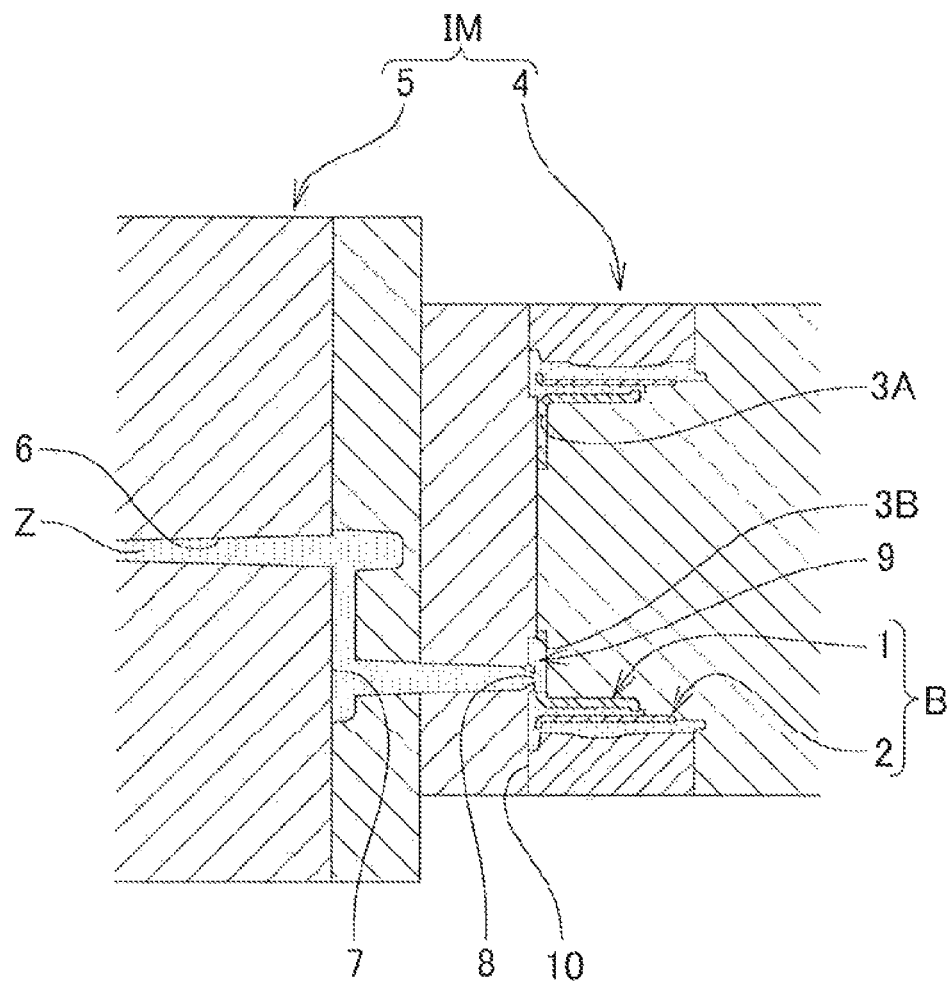
FIG. 10 is a vertical cross-sectional view of a state in which a molten thermoplastic resin is charged in a cavity from a fixed die.

With reference to the vertical cross-sectional views of FIGS. 8 to 10, insert molding of the toothed pulley A is described. In FIGS. 8 to 10, the upper side of the rotation axis O (FIG. 8) shows a cross section of the movable die and the metallic core B including the attachment hole 3A, and the lower side of the rotation axis O (FIG. 8) shows a cross section of the movable die and the metallic core B including the through hole 3B.

<Insert Article Setting Step>

As shown in FIGS. 8 and 9, the first metallic core 1 and the second metallic core 2, which are insert articles, are set in a movable die 4 of an injection molding die IM with the injection molding die IM being opened, so as to be placed in the injection molding die IM.

<Injection Molding Step>

As shown in FIG. 10, a molten thermoplastic resin material Z is injected through a sprue 6 of a fixed die 5 in a state where the injection molding die IM is closed and clamped. The molten thermoplastic resin material Z passes, from a gate 8, through a runner 7 to be charged in a cavity 9 between the fixed die 5 and the movable die 4. There are four gates 8, for example.

<Molded Article Taking-Out Step>

After the molten thermoplastic resin material Z is cooled and solidified, the movable die 4 is opened from a parting line 10 shown in FIG. 10, and the toothed pulley A that is a molded article is stuck out by an ejector pin (not shown) and is taken out. The toothed pulley A is provided with gate marks respectively at the centers of four recessed portions Y in FIG. 1.

Embodiment 2

<Toothed Pulley>

Figure 11:
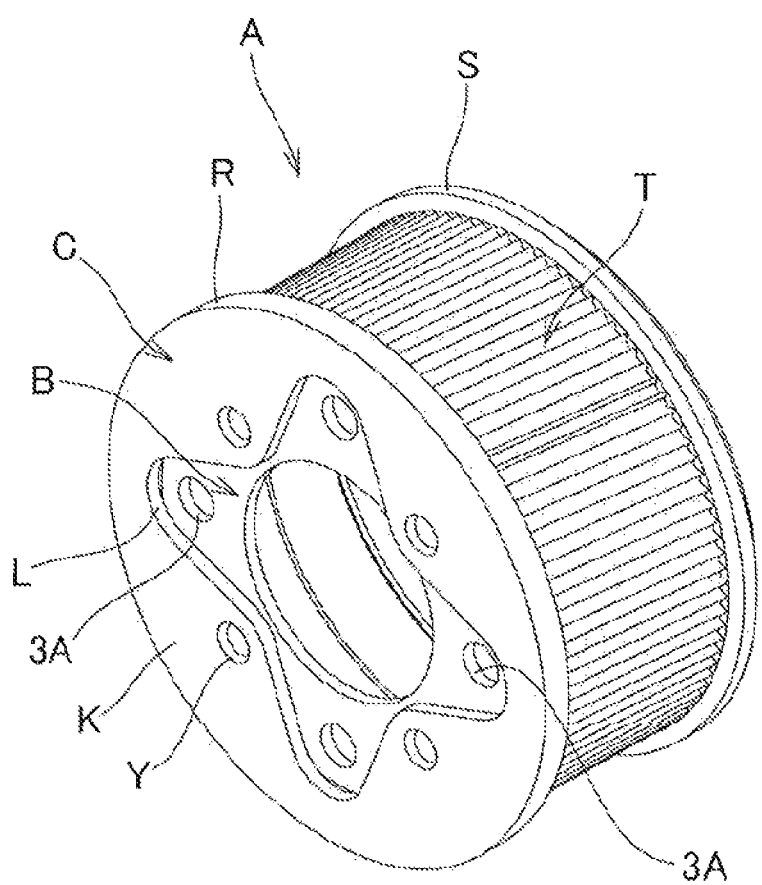
FIG. 11 is a perspective view of a toothed pulley according to Embodiment 2 of the present invention.
Figure 12:
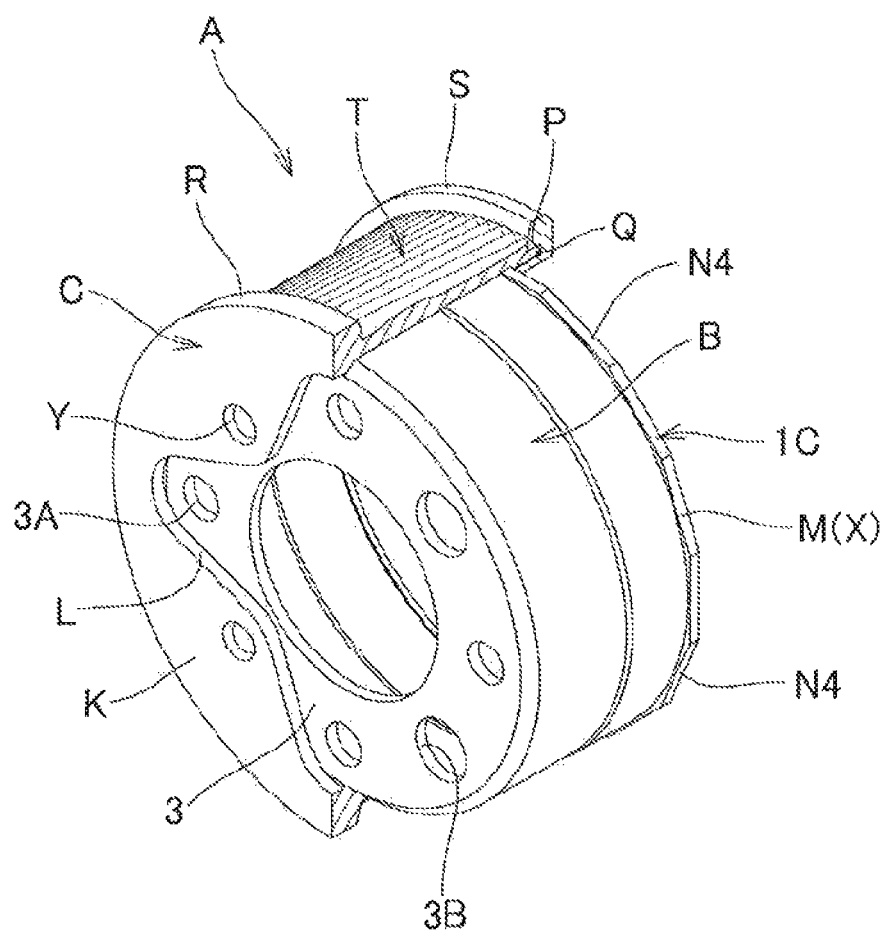
FIG. 12 is a perspective view with a partially cross-sectional view, showing the toothed pulley shown in FIG. 11.
Figure 13A:
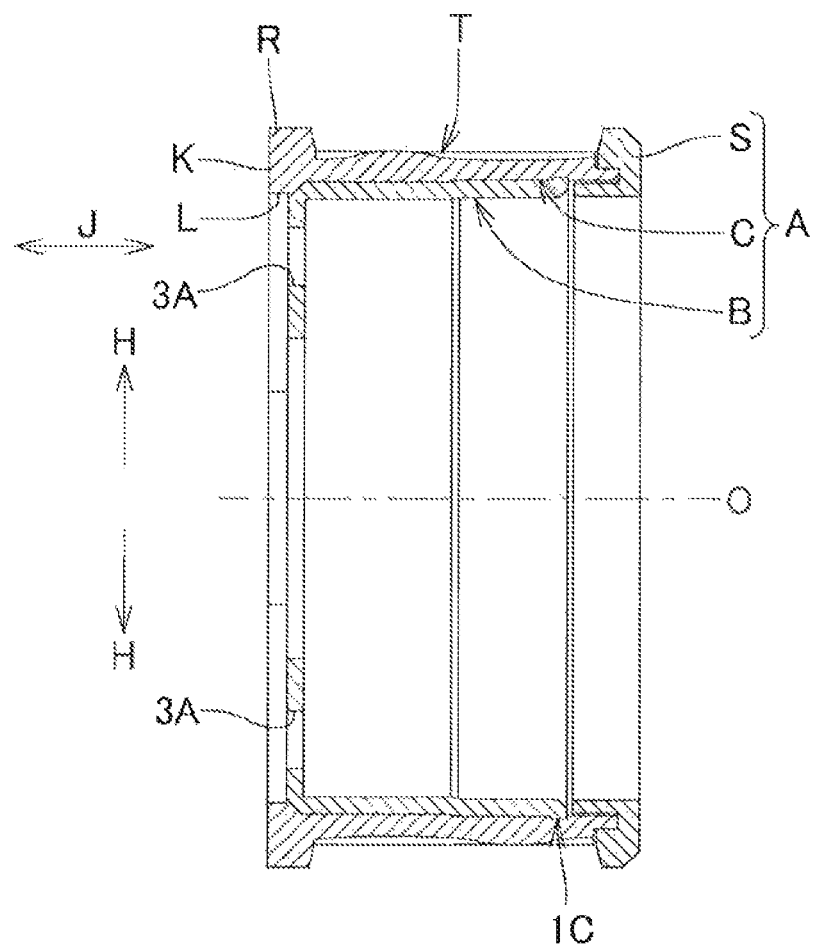
FIG. 13A is a vertical cross-sectional view of the toothed pulley shown in FIG. 11.
Figure 13B:
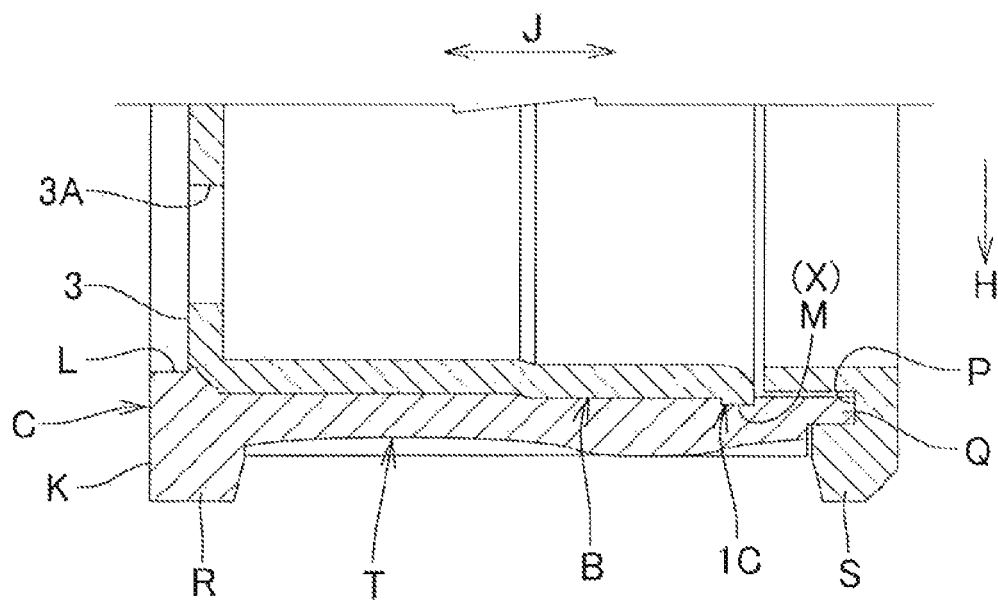
FIG. 13B is an enlarged vertical cross-sectional view of a main part of the toothed pulley shown in FIG. 13A.
Figure 14:
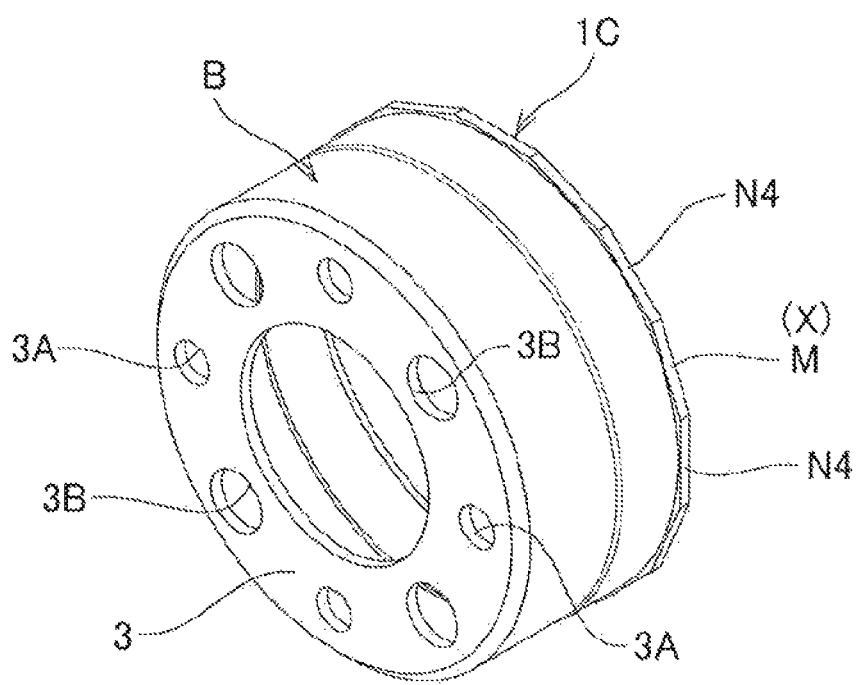
FIG. 14 is a perspective view of a metallic core.

As shown in the perspective view of FIG. 11, the perspective view with the partially cross-sectional view in FIG. 12, the vertical cross-sectional view of FIG. 13A, the enlarged vertical cross-sectional view of a main part in FIG. 13B, and the perspective view of FIG. 14, a toothed pulley A according to Embodiment 2 of the present invention includes a cylindrical metallic core B and a resin portion C including teeth T. In the toothed pulley A according to Embodiment 2 of the present invention, the metallic core B does not have the double structure, unlike the toothed pulley A according to Embodiment 1. In FIGS. 11 to 15B that show Embodiment 2, the reference signs same as those in FIGS. 1 to 6B showing Embodiment 1 indicate the same or corresponding components or parts.

<Rotation Prevention Shape>

As shown in the drawing seen in the axial direction of FIG. 15A and the explanatory view of an enlarged main part in FIG. 15B, the radially outer peripheral surface M of the outward flange 1C of the metallic core B has a shape defined by cutting a cylindrical surface U at a planar surface perpendicular to the radial direction H, and has 16 planar surfaces N4 at an equal interval in the circumferential direction. In other words, the planar surfaces N4 are parts defined by being displaced inward in the radial direction H from the cylindrical surface U. The radially outer peripheral surface M of the outward flange 1C of the metallic core B has a hexadodecagon seen in the axial direction J.

The radially outer peripheral surface M of the outward flange 1C has a shape including a plurality of parts N4 each of which is displaced inward in the radial direction H from the cylindrical surface U. The shape serves as a rotation prevention shape X for preventing the rotation of the metallic core B relative to the resin portion C in the circumferential direction I. In other words, the radial outer peripheral surface M (the shape X for preventing rotation in the circumferential direction I) of the outward flange 1C of the metallic core B is covered by the resin portion C, thereby preventing the first metallic core 1 and the resin portion C from relatively rotating in the circumferential direction I.

The shape X for preventing rotation in the circumferential direction I is not limited to the shapes shown in FIGS. 5A, 5B, 6A, 6B, 15A, and 15B, but may be a curved surface seen in the axial direction J, or may be a combination of a planar surface and a curved surface seen in the axial direction J. In other words, the radially outer peripheral surface V is merely required to include a plurality of parts displaced in the radially inward direction from the cylindrical surface, when the radially outer peripheral surface M of the outward flange 1C of the first metallic core 1, the radially outer peripheral surface M of the outward flange 1C of the metallic core B, and the radially outer peripheral surface V of the outward flange 2C of the second metallic core 2 are each defined as the shape X for preventing rotation in the circumferential direction I. The radially inner peripheral surface and the radially outer peripheral surface are merely required to have a plurality of parts displaced in the radially outward direction from the cylindrical surface, when an inward flange is formed in the second metallic core 2 to prevent the second metallic core 2 from rotating in the circumferential direction I. The shape X for preventing rotation in the circumferential direction I is formed through the press working or mechanical working.

The embodiments described above are all examples and are not limited thereto. Various improvements and variations can be applied without departing from the scope of the present invention.

The invention claimed is:

1. A toothed pulley comprising:
a cylindrical metallic core having an outer peripheral surface and an open interior, and
a resin portion including teeth, wherein
the cylindrical metallic core has, at a first end thereof in an axial direction parallel to a rotation axis of the toothed pulley, a bottom plate, the bottom plate extending from the outer peripheral surface inward toward the axis of rotation of the toothed pulley,
the cylindrical metallic core has, at a second end thereof in the axial direction, a first outward flange projecting outward in a radial direction,
the first outward flange has a radially outer peripheral surface extending radially beyond the outer peripheral surface of the cylindrical metallic core, the first outward flange defined by a plurality of first portions alternating with a plurality of second portions, the plurality of first portions having a first radially outer peripheral surface defining a portion of a cylindrical surface, the plurality of second portions having a second radially outer peripheral surface recessed radially inward from the cylindrical surface, the first radially outer peripheral surface and the second radially outer peripheral surface defining the outer peripheral surface of the first outward flange,
the cylindrical surface is concentric with a rotational axis of the toothed pulley,
the cylindrical metallic core, including the outer peripheral surface and the radially outer peripheral surface of the first outward flange is covered by molten thermoplastic resin that is cooled to form the resin portion, wherein the cylindrical metallic core is an insert article within the resin portion,
the bottom plate of the metallic core has a plurality of attachment holes and a plurality of through holes which the resin portion enters,
the resin portion has a bottom plate at one end thereof in the axial direction,
the bottom portion of the resin portion extends axially beyond the bottom plate of the metallic core and is disposed at least partially axially adjacent the bottom plate of the metallic core, and
the bottom plate of the resin portion is provided with a notch that provides axial exposure of each of the plurality of attachment holes in the bottom plate of the metallic core.

2. The toothed pulley according to claim 1, wherein
the metallic core includes
a first metallic core, and
a second metallic core that is positioned outward of the first metallic core in the radial direction to have a gap relative to the first metallic core in the radial direction, the second metallic core being concentric with the first metallic core, the first metallic core has, the bottom plate and the first outward flange, the resin portion is made of a thermoplastic resin, and the resin portion is a single component including a resin in the gap between the first metallic core and the second metallic core and a resin of the teeth.

3. The toothed pulley according to claim 2, wherein the second metallic core has, at a first end or a second end thereof in the axial direction, a second outward flange projecting radially outward, the second outward flange has a radially outer peripheral surface defined by a plurality of first portions alternating with a plurality of second portions, the plurality of first portions having a first radially outer peripheral surface defining a portion of a cylindrical surface, the plurality of second portions having a second radially outer peripheral surface recessed radially inward from the cylindrical surface, and the radially outer peripheral surface of the outward flange is covered by the resin portion.

4. The toothed pulley according to claim 1, wherein the resin portion has, at an end of the resin portion in the axial direction on a side of the first end, a resin portion outward flange projecting radially outward of a tip end of each of the teeth.

5. The toothed pulley according to claim 1, wherein a thickness F of a tooth bottom of each of the teeth in the resin portion in an inner diameter side thereof and whole depth E of each of the teeth satisfies $E \leq F \leq 3$ mm.

* * * * *